United States Patent
Dube et al.

(10) Patent No.: US 8,560,490 B2
(45) Date of Patent: Oct. 15, 2013

(54) COLLABORATIVE NETWORKING WITH OPTIMIZED INTER-DOMAIN INFORMATION QUALITY ASSESSMENT

(75) Inventors: Parijat Dube, Hawthorne, NY (US); Rahul Jain, Los Angeles, CA (US); Milind R. Naphade, Hawthorne, NY (US)

(73) Assignee: International Business Machines Corporation, Armonk, NY (US)

(*) Notice: Subject to any disclaimer, the term of this patent is extended or adjusted under 35 U.S.C. 154(b) by 792 days.

(21) Appl. No.: 12/709,823

(22) Filed: Feb. 22, 2010

(65) Prior Publication Data

US 2011/0208687 A1    Aug. 25, 2011

(51) Int. Cl.
*G06N 7/04*    (2006.01)

(52) U.S. Cl.
USPC .............................. 706/54; 706/52

(58) Field of Classification Search
USPC .............................. 706/54, 12, 52
See application file for complete search history.

(56) References Cited

U.S. PATENT DOCUMENTS

| | | | |
|---|---|---|---|
| 7,130,777 B2 | 10/2006 | Garg et al. | |
| 7,536,315 B2 | 5/2009 | Tsyganskiy et al. | |
| 2002/0095305 A1 | 7/2002 | Gakidis et al. | |
| 2004/0162751 A1 | 8/2004 | Tsyganskiy et al. | |
| 2006/0009994 A1* | 1/2006 | Hogg et al. | 705/1 |
| 2007/0208613 A1* | 9/2007 | Backer | 705/10 |
| 2008/0154883 A1* | 6/2008 | Chowdhury et al. | 707/5 |
| 2008/0274444 A1 | 11/2008 | Saliba | |
| 2009/0125382 A1* | 5/2009 | Delepet | 705/10 |
| 2009/0254499 A1* | 10/2009 | Deyo | 706/12 |

OTHER PUBLICATIONS

Nicolas Knotzer et al.; Consumer's Interest in Personalized Recommendations: The Role of Product-Involvement and Opinion Seeking; Proceedings of the 40th Hawaii International Conference on System Sciences—2007; pp. 9.

Mizil et al.; How Opinions are received by Online Communities: A Case Study on Amazon.com Helpfulness Votes; WWW Apr. 20-24, 2009, Madrid, Spain; pp. 141-150.

Talwar et al.; Understanding User Behavior in Online Feedback Reporting; EC'07, Jun. 11-15, 2007, San Diego, California, USA; pp. 134-142.

Avery et al. The "CAPS" Prediction System and Stock Market Returns. Introduction pp. 3-39, Apr. 2009. HKS Faculty Research Working Paper Series RWP11-028, John F. Kennedy School of Government, Harvard University.

* cited by examiner

*Primary Examiner* — Kakali Chaki
*Assistant Examiner* — Mai T Tran
(74) *Attorney, Agent, or Firm* — Cantor Colburn LLP; William Stock

(57) ABSTRACT

A method for implementing inter-domain information quality assessment includes calculating relationships among domains in a knowledge base by identifying features that respectively define each of the domains and identifying domains having correlating features. The method also includes assigning values to pairs of the domains that reflect a closeness of the relationships based upon the correlating features. The method further includes evaluating a reputation of an entity in one domain based on past performance of the entity with respect to another domain where the other domain is determined, via the assigned values, to be related to the domain. The past performance of the entity indicates capabilities of the entity to render accurate predictions about events in a particular domain. The method also includes calculating a value representing the reputation of the entity with respect to the domain based upon the evaluation and assigning the value representing the reputation to the entity.

24 Claims, 4 Drawing Sheets

COLLABORATIVE NETWORKING WITH OPTIMIZED INTER-DOMAIN INFORMATION QUALITY ASSESSMENT

BACKGROUND

This invention relates generally to network-based information analytics and optimization processes, and more particularly to collaborative networking optimized with quality assessment of inter-domain information provided by a network community.

Collaborative networking applications that are enabled through technologies such as Web 2.0 have brought forth the concept of crowd sourcing (also referred to as "the wisdom of crowds") to several e-business and social networking sites. Web 2.0 refers to an increasingly popular type of web application that is primarily distinguished in its ability to enable network users to contribute information for collaboration and sharing. Common collaborative networking applications include, e.g., social software, web syndication, weblogs, and wikis, to name a few. The ability to tap into the wisdom of the crowds through these applications can be a great differentiating asset for an individual or organization that utilizes these applications. For example, content reviews provided by a large online community can be exploited to determine trends, forecasts, and similar data, thereby enabling a content service provider to implement various monetization strategies derived from this collective wisdom.

The problem is that not every opinion received should be considered equal in terms of the expertise/reputation of those who contribute these opinions. Hence, certain network users who provide opinions on a subject (e.g., a product/service) may not be equally as qualified to comment on the future value of the subject as other network users. The future value of a product/service may be a measure of its success using metrics such as return on investment (ROI) or revenue generated.

It is oftentimes possible to identify a network user's expertise level a-priori based on a subjective evaluation of the network user and/or his/her credentials in a single domain or subject area. For example, a researcher in the field of machine learning may leverage his publishing record in this domain as a credential. However, the value of this researcher's credentials may be more difficult to assess when this individual opines on a subject that is in another domain, such as graphics or operating systems. Given that different individuals have differing expertise and credentials in different domains or areas of expertise, the difficulty in accurately evaluating various opinions of these individuals becomes much more complex. Currently, in today's Web 2.0 network environment, whereby individuals are likely to seamlessly cross domains and prolifically opine on subjects spread out through the domains, the ability to evaluate the opinions of these individuals becomes increasingly burdensome.

There is a need for an objective method for evaluating opinions or predictions gathered over a network from different entities across multiple domains and efficiently using these opinions or predictions to predict a future event (e.g., the success/failure of a product, movie, or a winner in elections, sports tournaments, etc), as well as infer reputation credentials of individuals for a domain according to the performance history of the individuals predictions or opinions in other closely related domains.

SUMMARY

An exemplary embodiment is a method for implementing inter-domain information quality assessment. The method includes calculating relationships among domains in a knowledge base by identifying features that respectively define each of the domains and identifying domains having correlating features. The method also includes assigning values to pairs of the domains that reflect a closeness of the relationships based upon the correlating features. The method further includes evaluating a reputation of an entity in one domain based on past performance of the entity with respect to another domain where the other domain is determined, via the assigned values, to be related to the domain. The past performance of the entity indicates capabilities of the entity to render accurate predictions about events in a particular domain. The method also includes calculating a value representing the reputation of the entity with respect to the domain based upon the evaluation and assigning the value representing the reputation to the entity.

Another exemplary embodiment is a computer program product for use by an inter-domain information quality assessment program for implementing inter-domain information quality assessment. The computer program product includes a tangible storage medium readable by a processing circuit and storing instructions for execution by the processing circuit for performing a method. The method includes calculating relationships among domains in a knowledge base by identifying features that respectively define each of the domains and identifying domains having correlating features. The method also includes assigning values to pairs of the domains that reflect a closeness of the relationships based upon the correlating features. The method further includes evaluating a reputation of an entity in one domain based on past performance of the entity with respect to another domain where the other domain is determined, via the assigned values, to be related to the domain. The past performance of the entity indicates capabilities of the entity to render accurate predictions about events in a particular domain. The method also includes calculating a value representing the reputation of the entity with respect to the domain based upon the evaluation and assigning the value representing the reputation to the entity.

A further exemplary embodiment is a system for implementing inter-domain information quality assessment. The system includes a computer processor and an inter-domain information quality assessment application executable by the computer processor. The inter-domain information quality assessment application is capable of performing a method. The method includes calculating relationships among domains in a knowledge base by identifying features that respectively define each of the domains and identifying domains having correlating features. The method also includes assigning values to pairs of the domains that reflect a closeness of the relationships based upon the correlating features. The method further includes evaluating a reputation of an entity in one domain based on past performance of the entity with respect to another domain where the other domain is determined, via the assigned values, to be related to the domain. The past performance of the entity indicates capabilities of the entity to render accurate predictions about events in a particular domain. The method also includes calculating a value representing the reputation of the entity with respect to the domain based upon the evaluation and assigning the value representing the reputation to the entity.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
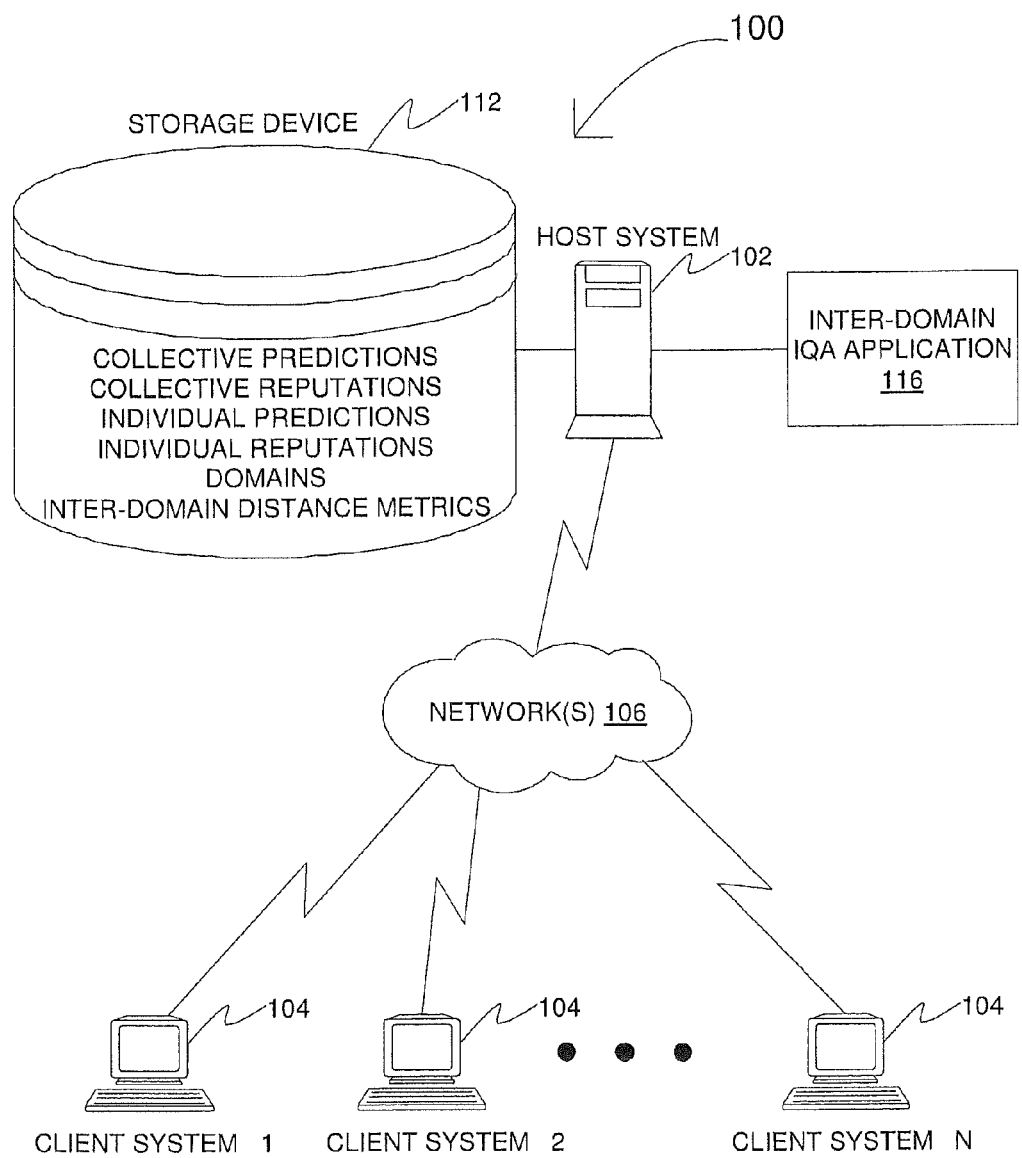
FIG. 1 illustrates a computing system for implementing inter-domain information quality assessment in an exemplary embodiment of the present invention.

An exemplary embodiment of the present invention is directed to implementing quality assessment of inter-domain information provided by entities of a collaborative network environment. Entities refer to online users of a common collaborative network or website. In an exemplary embodiment, a domain relates to a realm or range of knowledge that is attributed to a defined subject. The domain may be defined using ontological techniques which describe the logical structure of the domain, including its concepts and the relations between them. The inter-domain information quality assessment processes may be implemented for multiple domains that are part of a knowledge base.

The inter-domain information quality assessment process utilizes a reputation of an entity in a given domain to interpret and infer a reputation score for the entity in a domain in which the entity is believed to have little or no experience or expertise. This process is referred to herein as "cross-domain reputation inference." A reputation refers to the capabilities of the entity to render accurate predictions or opinions about events in a given domain. An event refers to a particular subject (e.g., problem, question, topic) for which an opinion/prediction may be rendered within a particular time frame. A reputation score is calculated and attributed to the entity based upon historical performance in rendering predictions or opinions about events associated with a particular domain. Thus, a high reputation score indicates a high degree of proficiency with the domain subject, while a low reputation score indicates a low degree of proficiency with the domain subject. The cross-domain reputation inference may be implemented by leveraging ontologies and statistical correlations among multiple domains in the knowledge base to build relationships among the domains and then mathematically compute these domains and their relationships to identify which of the domains may be related to the domain for which the reputation is to be inferred. This can also be supplemented by observing the performance of multiple entities in multiple domains and learning the statistical relationships among their reputations in the different domains.

Thus, the inter-domain information quality assessment process provides the ability to infer an entity's reputation in a domain using information about the entity's reputation in a different but closely related domain (i.e., an entity that renders accurate predictions about events in a domain based on the entity's knowledge of that domain is likely to make relatively good predictions in a different though closely related domain). For example, a person A who is an expert in housing market predictions (i.e., a first domain), is more likely to predict well about the construction jobs sector (a second domain related to the first domain) or furniture industry than a person B who is an expert in western classical music (a third domain that is unrelated to the first domain). Thus, when the event to be predicted is in domain of constructions jobs, the prediction made by A should be given a greater weight as compared to the prediction made by B. Likewise, when the event to be predicted is in domain of country music (e.g., the sale of records of a new album), then the prediction provided by B may be more valuable than that of A. This assessment is referred to as "prediction power," the results of which culminate into a reputation score for the entity with respect to the corresponding domain. Thus, the predictive power of an entity is a measure of how close the predictive outcome of an event made by the entity matches the actual outcome of the event.

The inter-domain information quality assessment process further enables the evaluation of each entity's current reputation within each domain according to the past performances of the entity within each domain, as well as the entity's past performance in other related domains. In addition, the inter-domain information quality assessment process evaluates the aggregate prediction for events across multiple domains based on the individual entity predictions within each domain along with the dynamically computed domain-dependent reputation of all the entities taking into account inter-domain relationships. The predictions are made for events within a defined decision interval. Future events may include e.g., the success/failure of a product, movie, or a winner in elections, sports tournaments, etc.

The predictive power of an entity is measured in terms of its reputation score. The reputation of the different entities is continually updated at each end of each decision interval. A decision interval starts with the system collecting predictions/opinions from different participating entities for an event belonging to any domain D, using the predictions to forecast the unknown event, and observing the outcome of the event. The decision interval culminates when the event is actually realized. The system makes forecasts by using the individual predictions from different entities and weighing them using reputation scores of the entities for the domain D and other domains, as well as a value representing the closeness of the relation. At the end of the decision interval not only an entity's reputation score for domain D is updated but also its reputation score in other domains is updated.

The inter-domain information quality assessment process provides a novel objective cumulative criterion to assess a participating entity's reputation. The inter-domain information quality assessment process closes the loop in terms of linking the effect of a community of reviewers' (i.e., participating entities) opinions to the objective metric of what impact this collective opinion had on objective metrics such as the sale of a product, a solution, a service, or the uptake of an idea or concept. Further, the inter-domain information quality assessment process also tracks performance of reviewers in different domains so as to provide a more holistic picture of the reputation of the reviewers.

Turning now to FIG. 1, a block diagram of a system 100 upon which the inter-domain information quality assessment processes may be implemented in exemplary embodiments will now be described. The system 100 of FIG. 1 includes a host system 102 in communication with client systems 104 via one or more network(s) 106. Host system 102 may be implemented using one or more servers operating in response to a computer program stored in a storage medium accessible by the server(s). The host system 102 may operate as a network server (e.g., a web server) to communicate with one or more client systems 104. The host system 102 may handle sending and receiving information to and from client systems 104 and may perform associated tasks.

The host system 102 may also operate as an application server. In accordance with exemplary embodiments, the host system 102 executes one or more computer programs to provide inter-domain information quality assessment services. These one or more computer programs are referred to collectively herein as an inter-domain information quality assessment application 116. Alternatively, a portion of the functionality of the inter-domain information quality assessment application 116 may be implemented via the client systems 104.

Inter-domain information quality assessment activities may be shared by the client systems 104 and the host system 102 by providing an application (e.g., java applet) to the client systems 104. Alternatively, client systems 104 may include stand-alone software applications for performing a portion of the processing described herein. In yet further embodiments, the inter-domain information quality assessment system functions may be built in to a web browser application executing on the client systems 104 (not shown). As previously described, it is understood that separate servers may be utilized to implement the network server functions and the application server functions of host system 102. Alternatively, the network server and the application server may be implemented by a single server executing computer programs to perform the requisite functions described with respect to host system 102.

Client systems 104 may be coupled to host system 102 via one or more network(s) 106. Each of the client systems 104 may be implemented using a general-purpose computer executing a computer program for carrying out some of the processes described herein. The client systems 104 may be personal computers (e.g., a lap top, a personal digital assistant) or host-attached terminals. For purposes of illustration, client systems 104 are operated by consumers of Internet services including web services. These consumers are referred to herein as "entities" and "reviewers," as will be described further herein.

In exemplary embodiments, the inter-domain information quality assessment system 100 shown in FIG. 1 includes a storage device 112. Storage device 112 is in communication with host system 102 and may be implemented using a variety of devices for storing electronic information. It is understood that the storage device 112 may be implemented using memory contained in the host system 102 or it may be a separate physical device, e.g., as shown in FIG. 1. The storage device 112 is logically addressable as a consolidated data source across a distributed environment that includes network(s) 106. Information stored in the storage device 112 may be retrieved and manipulated via the host system 102 and authorized users of client systems 104. The storage device 112 may house content data (e.g., one or more sources of information content subject for review by the client systems 104), content user records, (e.g., information relating to users of client systems 104), as well as defined domains, inter-domain distance metrics, individual and collective consumer reviews, assessments, and reputations, among other information desired by the service provider of host system 102. These features are described further herein. In an exemplary embodiment, the host system 102 operates as a database server and coordinates access to application data including data stored on storage device 112.

In an exemplary embodiment, the host system 102 represents a service provider implementing a collaborative application web service (e.g., social/business networking, wiki, weblog, news feed, and product/services, to name a few). In addition, the host system 102 represents a provider of the inter-domain information quality assessment services. However, it will be understood that the host system 102 may alternatively implement the inter-domain information quality assessment services on behalf of a different network entity (not shown), such as a collaborative content provider, as an application service provider (ASP).

Network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. Client systems 104 may be coupled to the host system 102 through multiple networks (e.g., intranet and Internet) so that not all client systems 104 are coupled to the host system 102 through the same network. One or more of the client systems 104 and the host system 102 may be connected to the network(s) 106 in a wireless fashion.

As indicated above, the inter-domain information quality assessment system may be implemented via a separate application 116 or may be built into one or more existing applications (e.g., a collaborative application or service implemented through Web 2.0).

Figure 2:
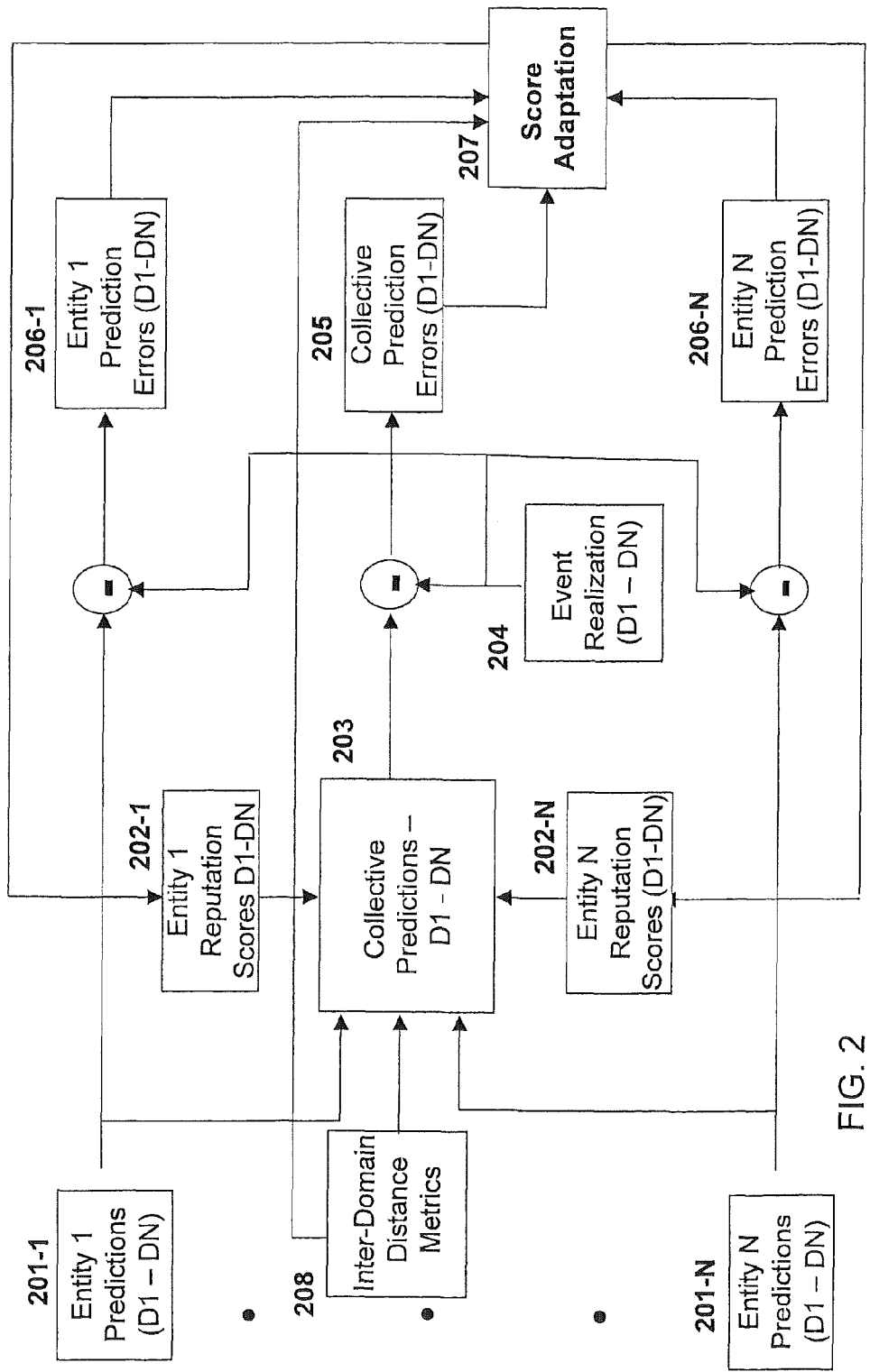
FIG. 2 illustrates a block diagram depicting the flow of data through inter-domain information quality assessment processes in an exemplary embodiment of the present invention.

Turning now to FIG. 2, a block diagram depicting the flow of data through the inter-domain information quality assessment processes will now be described in an exemplary embodiment. Individual predictions for entities 201-1 through 201-N (wherein 201-N represents the number of entities) for events are received by the inter-domain information quality assessment application 116. Each of entities 201-1-201N may submit multiple predictions in a number of domains D1-DN for corresponding events. These predictions may be in the form of some type of value indicative of the entity's opinion or forecast with respect to particular question, issue, or topic (i.e., event). For example, suppose the issue is directed to the proposed success or failure of a book that is yet to be released. By way of non-limiting examples, the prediction value may be represented in terms of the anticipated gross sales of the book, the number of expected copies sold, or a demographic attribute reflecting the type of consumer likely to be interested in the book.

The inter-domain information quality assessment application 116 also receives inter-domain distance metrics 208 for each of the domains D1-DN. The inter-domain distance metrics specify a measure of closeness of the relationships among each of the domains D1-DN. The inter-domain distance metric values may be implemented using a variety of techniques. For example, relationships among domains may be determined by identifying sets of features that define each respective domain. Using ontology-based processing, a hierarchical tree structure, or similar technique, the relationships (and degree of relation) among the domains may be established. For example, using a tree structure, the closeness of a relationship between two domains may be calculated by the number of hops between them. In an exemplary embodiment, correlations among the features that define a pair of domains may be used to determine the extent to which the pair of domains is related.

The inter-domain information quality assessment application 116 further receives reputation scores 202-1-202-N for each entity 201-1-201-N, whereby multiple reputation scores may be received for each entity 201-201-N for a number of domains D1-DN. The inter-domain information quality assessment application 116 processes the individual predictions for domains D1-DN with respect to entities 201-1 through 201-N and reputation scores 202-1 through 202-N associated with each of the entities (e.g., users of client systems 104) to derive a collective prediction value 203. The processing may include applying weights to the individual predictions based on a measure of the current reputations known for each of the respective entities with respect to an associated domain, the measure of closeness between the respective domains, and the associated prediction values. The inter-domain information quality assessment application 116 averages the predictions having the applied weights and in response to the processing. This processing is described further herein.

Upon determining the actual outcome of the events (also referred to as "event realization"), a value representing each of the actual outcomes 204 is processed with each of the respective collective prediction values 203 to derive corresponding collective prediction errors 205 for each of the domains. The inter-domain information quality assessment application 116 receives the collective prediction errors 205 and modifies or adjusts one or more reputation scores 207 of associated entities to reflect the deviation between the collective prediction values 203 and the collective prediction errors 205. The collective prediction values 203, collective prediction errors 205, and collective reputation scores 207 correspond to the aggregate of individual entities (also referred to herein as "community"). Thus, the aggregate of individual entities form a community whose members participate in the prediction of one or more events across one or more domains. The collective prediction errors 205 and the reputation scores 207 adjustments may be implemented using a variety of techniques, which will be described further herein.

In addition to the collective predictions and reputation score calculations and adjustments, the inter-domain information quality assessment application 116 also focuses on individual predictions and reputation score adjustments with respect to one or more events and across multiple domains. As shown in FIG. 2, for example, each of the entities (Entity 1 through Entity N, which correspond to one or more client systems 104) provides a corresponding predictions 201-1 through 201-N for associated domains D1-DN, which are processed in conjunction with the actual outcome values 204 to determine corresponding individual prediction error values 206-1 through 206-N for each of the affected domains D1-DN. The inter-domain information quality assessment application 116 adjusts the current reputation scores 202-1 through 202-N for each of the entities and for each of the affected domains and, during a subsequent event, the modified adapted reputation scores are input as reputation scores 202-1 through 202-N to a process for calculating a collective prediction value as described above, thereby ensuring a closed-loop process with dynamic updates to the individual and collective reputation scores.

In addition to evaluating each entity's current reputation within each domain according to the past performances of the entity within each domain (and past performance in other related domains), and evaluating the aggregate prediction for events across multiple domains based on the individual entity predictions within each domain along with the dynamically computed domain-dependent reputation of all the entities taking into account inter-domain relationships, the inter-domain information quality assessment process also provides the ability to infer an entity's reputation in a domain using information about the entity's reputation in a different but closely related domain. The reputation inference may be implemented using the inter-domain distance metrics in conjunction with the current reputation score for an entity based upon a particular domain. The inter-domain information quality assessment application 116 uses the inter-domain distance metrics to ascertain which domains in the knowledge base are identified as having a close relationship to the domain to which a reputation score will be inferred. The inter-domain information quality assessment application 116 also identifies whether the entity has an assigned reputation score associated with any of these closely related domains. If so, the inter-domain information quality assessment application 116 calculates (infers) a reputation score for the domain based upon the reputations scores of the closely related domains. This calculation is described further herein. The inter-domain distance metrics may be updated upon observing an outcome of an event to which predictions have been made. The inter-domain distance metrics may be updated, e.g., by calculating the correlation between the correctness of predictions (a measure such as a loss function) made by each member of a subset of entities in different domains. A sample loss function is described further herein. A high degree of correlation in the predictions for a majority of users implies that the domains are close.

Figure 3:
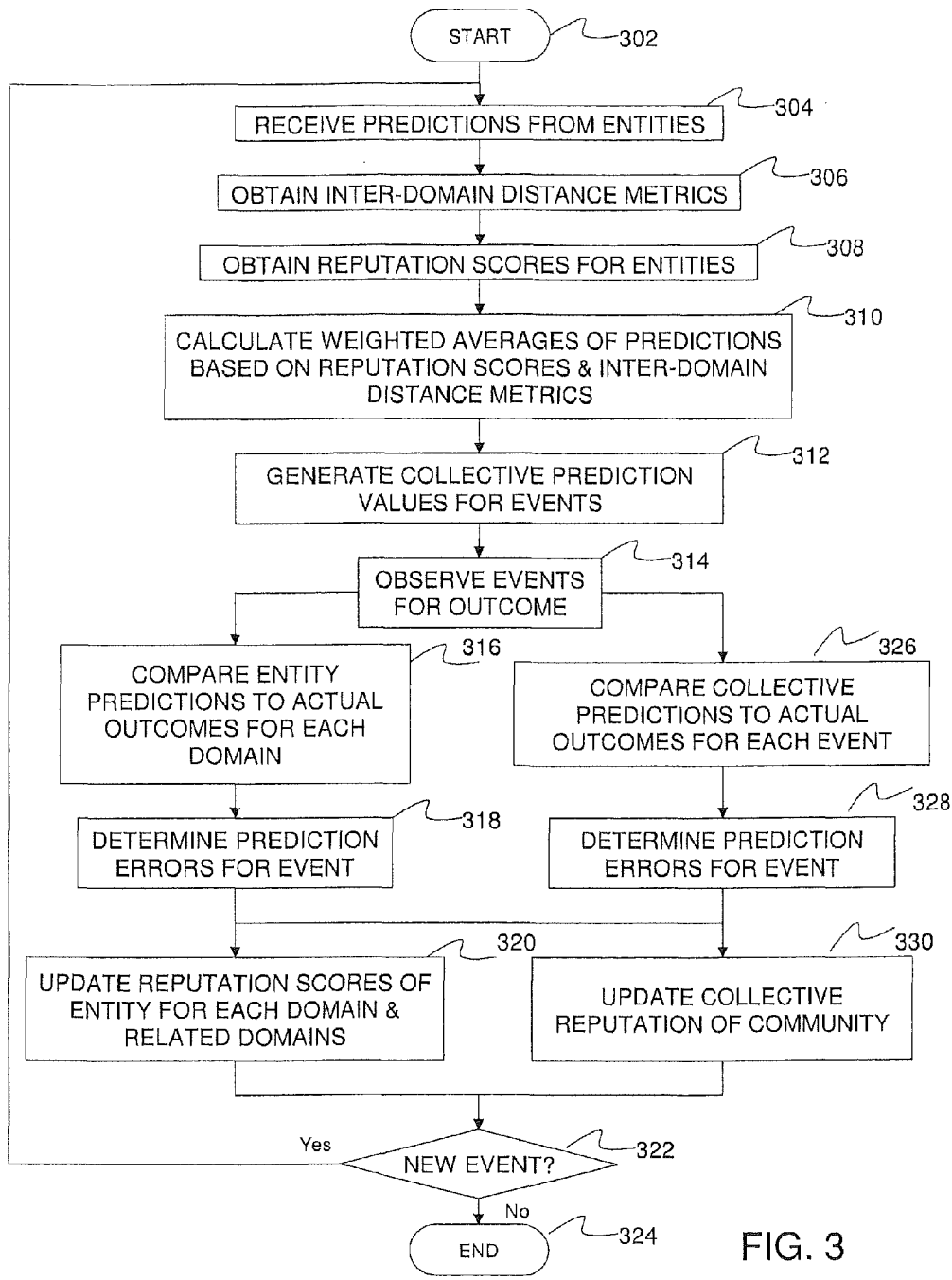
FIG. 3 illustrates a flow diagram describing a process for implementing inter-domain information quality assessment in an exemplary embodiment of the present invention.

Turning now to FIG. 3, an exemplary process for implementing inter-domain information quality assessment will now be described. The process begins at step 302 whereby the inter-domain information quality assessment application 116 receives predictions from entities (e.g., client systems 104) for events at step 304. Each of the events is associated with a particular domain. The inter-domain information quality assessment application 116 obtains inter-domain distance metrics for the affected domains at step 306. The application 116 obtains reputation scores for each of the participating entities (i.e., those who have submitted their predictions) at step 308. These may include multiple reputation scores for each entity (e.g., one reputation score for each domain). Once all of the available reputation scores are obtained, the inter-domain information quality assessment application 116 processes the prediction values in view of corresponding reputation scores (e.g., using a weighted average) and the inter-domain distance metrics at step 310. At step 312, the inter-domain information quality assessment application 116 generates collective prediction values for the events from the processing described in step 310.

At step 314, the inter-domain information quality assessment application 116 determines the actual outcomes of the events, e.g., by observation. At step 316, the inter-domain information quality assessment application 116 compares the predicted outcome values for each of the individual entities with the actual outcome values for each of the affected domains. The inter-domain information quality assessment application 116 uses the actual outcome values and the predicted outcome values associated with each entity and for each domain to calculate a corresponding prediction error for each of the corresponding entities at step 318. The prediction errors are then used by the inter-domain information quality assessment application 116 to re-calculate (or derive, if this is the first prediction made by the entity) the reputation scores of the entity with respect to each of the domains at step 320. In addition, the inter-domain information quality assessment application 116 may also use a collective prediction error derived from step 328 in calculating the updated reputation scores for the entity. These reputation scores made be stored in storage device 112 for future recall and adjustments. At step 322, it is determined whether a new event is presented to the community for prediction. If so, the process returns to step 304. Otherwise, the process ends at step 324.

Turning back to step 314, once the actual outcomes of the events have occurred, the inter-domain information quality assessment application 116 performs similar processing on the collective prediction values. At step 326, the inter-domain information quality assessment application 116 compares the collective predicted outcome values with the actual outcome values for each event. The inter-domain information quality assessment application 116 uses the actual outcome values and the collective predicted outcome values associated with the community to calculate respective collective prediction errors for each event at step 328. The collective prediction errors are then used by the inter-domain information quality assessment application 116 to re-calculate (or derive, if this is the first prediction made by the community) the reputation score of the community for each event at step 330. These collective reputation scores made be stored in storage device 112 for future recall and adjustments. As indicated above, the collective prediction errors for each event may be used to update the individual reputation scores of entities for each domain and across domains (step 320). The process then proceeds to step 322, where it is determined whether a new event is presented to the community for prediction. If so, the process returns to step 304. Otherwise, the process ends at step 324.

As indicated above in FIG. 2, various techniques may be employed to derive the individual and collective prediction values, the individual and collective prediction errors, the individual and collective reputation scores and adjustments, and the individual reputation scores across related domains. Some of these techniques will now be described.

Let the number of entities who make predictions be N. Consider a decision time t. At a decision time, the inter-domain information quality assessment application 116 collects predictions about the outcome y(t) of an unknown event from these N entities. Observe that y(t) can be a vector of events from different domains. Thus $y(t)=[y^1(t), y^2(t), \ldots, y^d(t)]$. Let the predictions of y(t) made by these N entities be $x_1(t), x_2(t), \ldots, x_N(t)$. For any entity i, prediction $x_i(t)$ can also be a vector of prediction for different domains. Thus $x_i(t)=[x_i^1(t), x_i^2(t), \ldots, x_i^D(t)]$. The inter-domain information quality assessment application 116 takes predictions from these N entities and uses them to forecast the value of y(t). The inter-domain information quality assessment application 116 makes a prediction $p(t)=[p^1(t), p^2(t), \ldots, p^D(t)]$ based on expert's predictions and their reputation scores. One approach can be to use a weighted average of the predictions of different entities where the weight of an entity is its reputation score. This can be represented as:

$$p^d(t) = \frac{\sum_i w_{i,t-1}^d x_i^d(t)}{\sum_i w_{i,t-1}^d};$$

where $w_{i,t-1}$ is the reputation score of expert i at decision epoch t.

Define $L^d(p^d, y^d)$ to be the loss for the inter-domain information quality assessment system and $L^d(x_i^d, y)$ to be the loss for the entity i in domain d. The loss is a measure of the mismatch between the prediction and the actual value of the event in domain d. A measure of the goodness of prediction made by an entity in domain d is the cumulative regret in domain d, $R_{i,t}^d$, given by the aggregate of the difference between the system loss and entity until time t in domain d. Thus, $$R_{i,t}^d = \sum_{s=1}^{t} L^d(p^d(s), y^d(s)) - L^d(x_i^d(s), y_i^d(s)).$$

The goal of the inter-domain information quality assessment system is to minimize the cumulative regret across all the domains, $R_{i,t}$ with respect to each entity. One measure of cumulative regret across all domains for entity i can be given by the sum of cumulative regret of entity i for each domain. Thus, $R_{i,t}=R_{i,t}^1+R_{i,t}^2+\ldots+R_{i,t}^D$.

Another measure of cumulative regret across domains can be the cumulative regret for the domain with the largest cumulative regret for entity i. Thus, $R_{i,t}=\max(R_{i,t}^1, R_{i,t}^2, R_{i,t}^D)$.

The inter-domain information quality assessment application 116 updates the reputation score of each entity after an event is realized so as to minimize the regret. The idea is to increase the reputation score of those entities whose cumulative regret is small and to decrease the reputation score of entities with larger cumulative regret.

Define a potential function of cumulative regret until time t:

$$\Phi(R_t) = \Psi\left(\sum_{i=1}^{N} \Phi(R_{i,t}^1, R_{i,t}^2, \ldots, R_{i,t}^D)\right);$$

were $\Psi$ is non-negative, strictly increasing, concave and differentiable function; $\Phi$ is a non-negative, increasing and differentiable function. When $\Phi$ is exponential and $\Psi$ is logarithmic:

$$\Phi(R) = \frac{1}{\beta}\ln\left(\sum_{i=1}^{N}\prod_{d=1}^{D}\exp(\beta_d R_i^d)\right), \beta_d, \beta > 0.$$

Let $\alpha_{jd}$ be a measure of distance between domain j and d. The reputation scores in domain j are then updated as $$w_{i,t}^j = \sum_{d=1,\ldots,D; d\neq j} \alpha_{jd} \frac{\partial \Phi}{\partial R_{i,t}^d}.$$

Using the above references, the inter-domain information quality assessment application 116 implements the inter-domain information quality assessments via the following. Initialize at time t=0, reputation scores $w_i^j(0)=1$, for all entities i=1, ..., N and for all domains j=1, ..., D. Then, perform for each time t=1, 2, ...,: collect predictions $x_i(t)$ from all entities i on the unknown event y(t); compute collective prediction for each domain j, $$p^j(t) = \frac{\sum_i w_{i,t-1}^j x_i(t)}{\sum_i w_{i,t-1}^j};$$

observe event $y(t)=[y^1(t), y^2(t), \ldots, y^d(t)]$. y(t) is a collection of events in different domains; compute cumulative regret $R_{i,t}$ until time t for all entities i using $$R_{i,t}^j = \sum_{s=1}^t L^j(p^j(s), y^j(s)) - L^j(x_i^j(s), y_i^j(s));$$

and update reputation scores of all entities i using $$w_{i,t}^j = \sum_{d=1,\ldots,D;d\neq j} \alpha_{jd} \frac{\partial \Phi}{\partial R_{i,t}^d}.$$

Technical effects and benefits include an optimized collaborative web service that evaluates individual, as well as aggregate, predictions based upon dynamically updated reputations of the individuals and communities participating in the prediction process. The optimized collaborative web service provides high-quality predictions of events across domains as well as within domains with respect to participating individuals.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
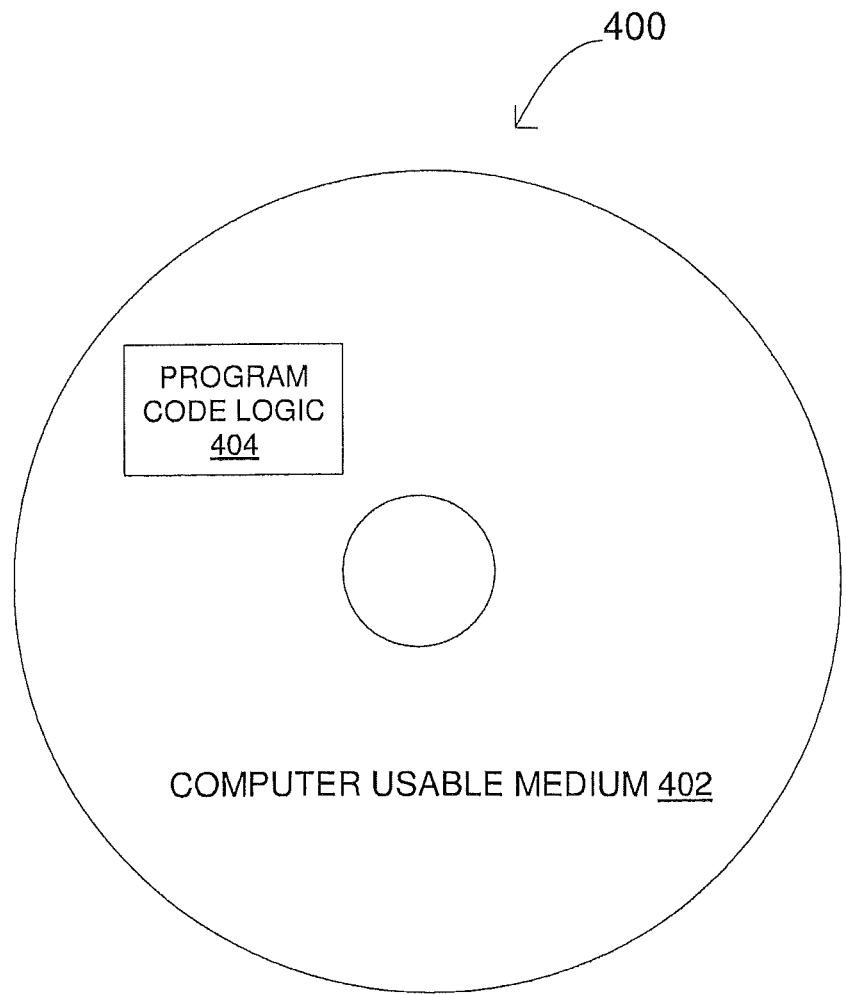
FIG. 4 illustrates a computer program product that may be implemented by an exemplary embodiment.

As described above, embodiments can be embodied in the form of computer-implemented processes and apparatuses for practicing those processes. In exemplary embodiments, the invention is embodied in computer program code executed by one or more network elements. Embodiments include a computer program product 400 as depicted in FIG. 4 on a computer usable medium 402 with computer program code logic 404 containing instructions embodied in tangible media as an article of manufacture. Exemplary articles of manufacture for computer usable medium 402 may include floppy diskettes, CD-ROMs, hard drives, universal serial bus (USB) flash drives, or any other computer-readable storage medium, wherein, when the computer program code logic 404 is loaded into and executed by a computer, the computer becomes an apparatus for practicing the invention. Embodiments include computer program code logic 404, for example, whether stored in a storage medium, loaded into and/or executed by a computer, or transmitted over some transmission medium, such as over electrical wiring or cabling, through fiber optics, or via electromagnetic radiation, wherein, when the computer program code logic 404 is loaded into and executed by a computer, the computer becomes an apparatus for practicing the invention. When implemented on a general-purpose microprocessor, the computer program code logic 404 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing inter-domain information quality assessment, comprising:
   calculating, at a computer, relationships among domains in a knowledge base by identifying features that respectively define each of the domains and identifying domains having correlating features;
   assigning, at the computer, values to pairs of the domains that reflect a closeness of the relationships based upon the correlating features;
   evaluating, at the computer, a reputation of an entity in one domain based on past performance of the entity with respect to another domain where the other domain is determined, via the assigned values, to be related to the domain, the past performance of the entity indicating capabilities of the entity to render accurate predictions about events in a particular domain;
   calculating, at the computer, a value representing the reputation of the entity with respect to the domain based upon the evaluating; and
   assigning the value representing the reputation to the entity.

2. The method of claim 1, wherein the domain represents a subject in which there is no a priori knowledge of predictions rendered by the entity.

3. The method of claim 1, further comprising evaluating, at the computer, the reputation of the entity in the domain based on past performance of the entity with respect to the domain.

4. The method of claim 1, further comprising:
   receiving, at the computer, a value relating to a predicted outcome of an event from the entity and at least one other entity, the event associated with a domain;
   receiving, at the computer, a value representing the reputation for the entity and a value representing a reputation for the at least one other entity with respect to the domain;
   receiving, at the computer, inter-domain distance metrics specifying the values assigned to the pairs of the domains reflecting a closeness of the relationships;
   calculating, at the computer, a weighted average of the values received relating to the predicted outcome for the event, where the weighted average is based upon reputation scores associated with the entity and the at least one other entity with respect to the domain, the inter-domain distance metrics, and reputation scores of the entity and the at least one other entity for others of the domains determined to be related to the domain via the inter-domain distance metrics; and
   generating, at the computer, a collective prediction value for the event that reflects a collective prediction for the event, the collective prediction value generated from calculating the weighted average of the values.

5. The method of claim 4, further comprising:
   comparing, at the computer, the value relating to the predicted outcome for each of the entity and the at least one other entity with a value specifying an actual outcome for the event with respect to the domain;
   determining, at the computer, a prediction error value for each of the entity and the at least one other entity with respect to the domain in response to the comparing, the prediction error value reflecting a difference between the value of the predicted outcome and the value of the actual outcome; and
   using the prediction error value for the domain, assigning or updating, at the computer, the reputation scores for the entity and the at least one other entity with respect to the domain and respective related domains.

6. The method of claim 4, further comprising:
   updating, at the computer, the inter-domain distance metrics based upon the predicted outcome of the event.

7. The method of claim 4, wherein the weighted average is determined by a function:

$$p^d(t) = \frac{\sum_i w_{i,t-1}^d x_i^d(t)}{\sum_i w_{i,t-1}^d};$$

wherein t represents a decision time during which predictions are collected for the event, d represents a domain, w represents a reputation score, i represents an index for the entity, and $w_{i,t-1}$ represents a reputation score of an entity i at decision time t.

8. The method of claim 1, wherein the value representing the reputation is derived by a function:

$$w_{i,t}^j = \sum_{d=1,\ldots,D;d \neq j} \alpha_{jd} \frac{\partial \Phi}{\partial R_{i,t}^d};$$

wherein t represents a decision time during which predictions are collected for the event, y represents an outcome of the event, d represents a domain, D represents the number of domains, w represents a reputation score, i represents an index for the entity, and R represents a measure of accuracy of a prediction.

9. A computer program product for use by an inter-domain information quality assessment program for implementing inter-domain information quality assessment optimization, the computer program product comprising:
a non-transitory storage medium readable by a processing circuit and storing instructions for execution by the processing circuit for performing a method comprising:
calculating relationships among domains in a knowledge base by identifying features that respectively define each of the domains and identifying domains having correlating features;
assigning values to pairs of the domains that reflect a closeness of the relationships based upon the correlating features;
evaluating a reputation of an entity in one domain based on past performance of the entity with respect to another domain where the other domain is determined, via the assigned values, to be related to the domain, the past performance of the entity indicating capabilities of the entity to render accurate predictions about events in a particular domain;
calculating a value representing the reputation of the entity with respect to the domain based upon the evaluating; and
assigning the value representing the reputation to the entity.

10. The computer program product of claim 9, wherein the domain represents a subject in which there is there is no a priori knowledge of predictions rendered by the entity.

11. The computer program product of claim 9, wherein the method further comprises evaluating the reputation of the entity in the domain based on past performance of the entity with respect to the domain.

12. The computer program product of claim 9, wherein the method further comprises:
receiving a value relating to a predicted outcome of an event from the entity and at least one other entity, the event associated with a domain;
receiving a value representing the reputation for the entity and a value representing a reputation for the at least one other entity with respect to the domain;
receiving inter-domain distance metrics specifying the values assigned to the pairs of the domains reflecting a closeness of the relationships;
calculating a weighted average of the values received relating to the predicted outcome for the event, where the weighted average is based upon reputation scores associated with the entity and the at least one other entity with respect to the domain, the inter-domain distance metrics, and reputation scores of the entity and the at least one other entity for others of the domains determined to be related to the domain via the inter-domain distance metrics; and
generating a collective prediction value for the event that reflects a collective prediction for the event, the collective prediction value generated from calculating the weighted average of the values.

13. The computer program product of claim 12, wherein the method further comprises:
comparing the value relating to the predicted outcome for each of the entity and the at least one other entity with a value specifying an actual outcome for the event with respect to the domain;
determining a prediction error value for each of the entity and the at least one other entity with respect to the domain in response to the comparing, the prediction error value reflecting a difference between the value of the predicted outcome and the value of the actual outcome; and
using the prediction error value for the domain, assigning or updating the reputation scores for the entity and the at least one other entity with respect to the domain and respective related domains.

14. The computer program product of claim 12, wherein the method further comprises:
updating the inter-domain distance metrics based upon the predicted outcome of the event.

15. The computer program product of claim 12, wherein the weighted average is determined by a function:

$$p^d(t) = \frac{\sum_i w_{i,t-1}^d x_i^d(t)}{\sum_i w_{i,t-1}^d};$$

wherein t represents a decision time during which predictions are collected for the event, d represents a domain, w represents a reputation score, i represents an index for the entity, and $w_{i,t-1}$ represents a reputation score of an entity i at decision time t.

16. The computer program product of claim 9, wherein the value representing the reputation is derived by a function:

$$w_{i,t}^j = \sum_{d=1,\ldots,D;d \neq j} \alpha_{jd} \frac{\partial \Phi}{\partial R_{i,t}^d};$$

wherein t represents a decision time during which predictions are collected for the event, y represents an outcome of the event, d represents a domain, D represents the number of domains, w represents a reputation score, i represents an index for the entity, and R represents a measure of accuracy of a prediction.

17. A system for implementing inter-domain information quality assessment optimization, the system comprising:

a computer; and an inter-domain information quality assessment application executable by the computer, the inter-domain information quality assessment application configured to perform a method comprising:

calculating relationships among domains in a knowledge base by identifying features that respectively define each of the domains and identifying domains having correlating features;

assigning values to pairs of the domains that reflect a closeness of the relationships based upon the correlating features;

evaluating a reputation of an entity in one domain based on past performance of the entity with respect to another domain where the other domain is determined, via the assigned values, to be related to the domain, the past performance of the entity indicating capabilities of the entity to render accurate predictions about events in a particular domain;

calculating a value representing the reputation of the entity with respect to the domain based upon the evaluating; and assigning the value representing the reputation to the entity.

18. The system of claim 17, wherein the domain represents a subject in which there is no a priori knowledge of predictions rendered by the entity.

19. The system of claim 17, wherein the method further comprises evaluating the reputation of the entity in the domain based on past performance of the entity with respect to the domain.

20. The system of claim 17, wherein the method further comprises:

receiving a value relating to a predicted outcome of an event from the entity and at least one other entity, the event associated with a domain;

receiving a value representing the reputation for the entity and a value representing a reputation for the at least one other entity with respect to the domain;

receiving inter-domain distance metrics specifying the values assigned to the pairs of the domains reflecting a closeness of the relationships;

calculating a weighted average of the values received relating to the predicted outcome for the event, where the weighted average is based upon reputation scores associated with the entity and the at least one other entity with respect to the domain, the inter-domain distance metrics, and reputation scores of the entity and the at least one other entity for others of the domains determined to be related to the domain via the inter-domain distance metrics; and generating a collective prediction value for the event that reflects a collective prediction for the event, the collective prediction value generated from calculating the weighted average of the values.

21. The system of claim 20, wherein the method further comprises:

comparing the value relating to the predicted outcome for each of the entity and the at least one other entity with a value specifying an actual outcome for the event with respect to the domain;

determining a prediction error value for each of the entity and the at least one other entity with respect to the domain in response to the comparing, the prediction error value reflecting a difference between the value of the predicted outcome and the value of the actual outcome; and using the prediction error value for the domain, assigning or updating the reputation scores for the entity and the at least one other entity with respect to the domain and respective related domains.

22. The system of claim 20, wherein the method further comprises:

updating the inter-domain distance metrics based upon the predicted outcome of the event.

23. The system of claim 20, wherein the weighted average is determined by a function:

$$p^d(t) = \frac{\sum_i w_{i,t-1}^d x_i^d(t)}{\sum_i w_{i,t-1}^d};$$

wherein t represents a decision time during which predictions are collected for the event, d represents a domain, w represents a reputation score, i represents an index for the entity, and $w_{i,t-1}$ represents a reputation score of an entity i at decision time t.

24. The system of claim 17, wherein the value representing the reputation is derived by a function:

$$w_{i,t}^j = \sum_{d=1,\ldots,D; d \neq j} \alpha_{jd} \frac{\partial \Phi}{\partial R_{i,t}^d};$$

wherein t represents a decision time during which predictions are collected for the event, y represents an outcome of the event, d represents a domain, D represents the number of domains, w represents a reputation score, i represents an index for the entity, and R represents a measure of accuracy of a prediction.

* * * * *